United States Patent [19]

Kriegsman et al.

[11] Patent Number: 5,534,865
[45] Date of Patent: Jul. 9, 1996

[54] ERGONOMIC WIRELESS REMOTE CONTROL TRANSMITTER FOR USE WITH CONSUMER ENTERTAINMENT ELECTRONICS APPLIANCE

[76] Inventors: Irving M. Kriegsman, 250 Baldwin Ave.; Edward M. Kriegsman, 215 Baldwin Ave.; Daniel S. Kriegsman, 250 Baldwin Ave., all of Framingham, Mass. 01701

[21] Appl. No.: 984,184

[22] Filed: Nov. 20, 1992

[51] Int. Cl.$^6$ .................................................. H04B 10/00
[52] U.S. Cl. .......................................... 341/176; 359/142
[58] Field of Search ......................... 341/176; 358/194.1; 359/142, 146, 148; 340/825.69, 825.72; D13/168; D14/218

[56] References Cited

U.S. PATENT DOCUMENTS

| D. 298,749 | 11/1988 | Yant .................................... D13/168 |
|---|---|---|
| 4,377,006 | 3/1983 | Collins et al. . |
| 4,425,647 | 1/1984 | Collins et al. . |
| 4,626,847 | 12/1986 | Zato . |
| 4,945,216 | 7/1990 | Tanabe et al. ........................ 359/142 |
| 5,005,084 | 4/1991 | Skinner . |
| 5,073,979 | 12/1991 | Webb . |
| 5,228,077 | 7/1993 | Darbee . |
| 5,243,430 | 9/1993 | Emmons .............................. 358/194.1 |
| 5,253,068 | 10/1993 | Crook et al. ........................ 340/825.72 |

FOREIGN PATENT DOCUMENTS

| 2714874 | 10/1978 | Germany ............................... 455/352 |
|---|---|---|
| 1-50699 | 2/1989 | Japan . |
| 3-69222 | 3/1991 | Japan . |
| 4056537 | 2/1992 | Japan . |
| 2146813 | 4/1985 | United Kingdom ..................... 359/42 |
| 9107826 | 5/1991 | WIPO ............................... 340/825.72 |

OTHER PUBLICATIONS

The entry on pp. 512–513 of the Dec. 2, 1986 edition of the Official Gazette (Patents) of the U.S. Patent and Trademark Office for U.S. Patent No. 4,626,848.

*Primary Examiner*—Michael Horabik
*Attorney, Agent, or Firm*—Kriegsman & Kriegsman

[57] ABSTRACT

A wireless remote control transmitter for remotely controlling the operation of home entertainment devices. In one embodiment, the transmitter comprises a generally rectangular housing having a top end, a bottom end, a front, a back, a right side and a left side. An L-shaped printed circuit board is disposed within the housing, the board having a front portion extending generally parallel to the front of the housing and a right portion extending generally parallel to the right side of the housing. The printed circuit board includes a first LED adapted to transmit a beam of infrared light through a window in the top end of the housing, a second LED adapted to transmit a beam of infrared light through a window in the right side of the housing, and suitable electronics. A first keyboard, whose keys are accessible from the front of the housing, is positioned over the front of the printed circuit board. A second keyboard, whose keys are accessible from the right side of the housing, is positioned over the right portion of the printed circuit board. Depression of the keys of the first keyboard against the front of the printed circuit board causes the first LED to emit appropriately coded signals through the top end of the housing. Depression of the keys of the second keyboard against the right side of the printed circuit board causes the second LED to emit appropriately coded signals through the right side of the housing.

13 Claims, 7 Drawing Sheets

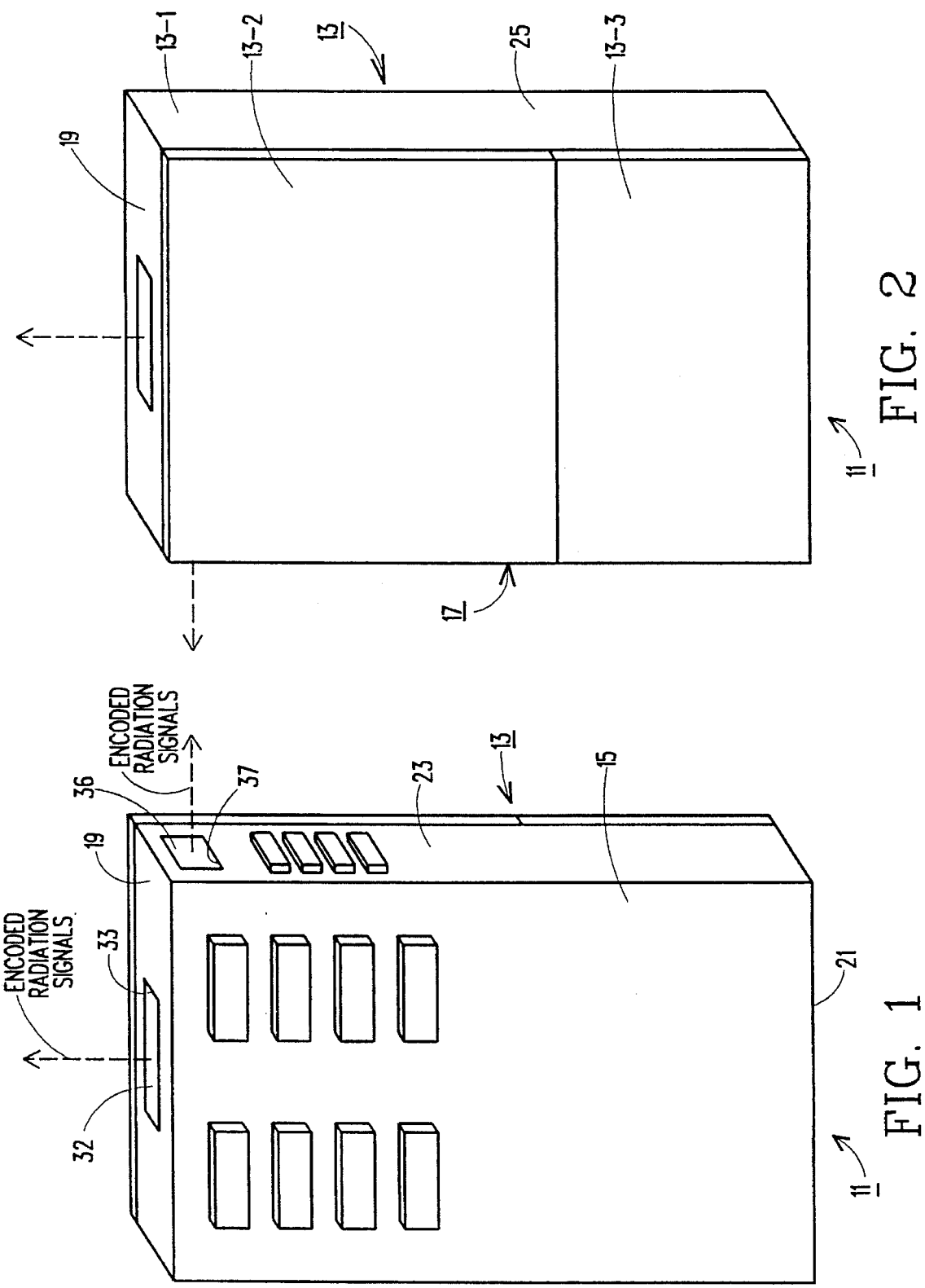

ERGONOMIC WIRELESS REMOTE CONTROL TRANSMITTER FOR USE WITH CONSUMER ENTERTAINMENT ELECTRONICS APPLIANCE

BACKGROUND OF THE INVENTION

The present invention relates to wireless remote control transmitters of the type typically used to control the operation of one or more consumer entertainment electronics appliances, such as television sets, video cassette recorders, stereo systems and the like.

Wireless remote control transmitters of the type typically used to control the operation of consumer entertainment electronics appliances are well known in the art. Typically, such transmitters are hand-held devices comprising an elongated generally rectangularly shaped housing having a front, a back, a top end, a bottom end and a pair of sides, the housing containing a printed circuit board having electronics including an infrared LED, a keyboard having a plurality of function-selection keys, the keys being actuable from the front of the housing and one or more batteries for providing power for the transmitter. In use, actuation of a selected key on the keyboard causes a correspondingly coded optical signal to be transmitted from the infrared LED through an opening in the top end of the housing to a receiver in the targeted electronic appliance. Typically, the front of the housing is considerably wider than the sides to accommodate the arrangement of a plurality of keys.

Additional information relating generally to wireless remote control transmitters may be found in U.S. Pat. No. 4,377,006 to Collins et al., U.S. Pat. No. 4,425,647 to Collins et al., U.S. Pat. No. 4,626,847 to Zato, U.S. Pat. No. 4,626,848 to Ehlers, U.S. Pat. No. 5,073,979 and U.S. Pat. No. 5,005,084 to Skinner.

Wireless remote control transmitters as described above are typically held in a user's hand by resting the back of the housing against the user's index finger while inward pressure is applied to sides of the housing using the user's thenar eminence and thumb on one side and the remaining fingers on the opposite side. With the unit thus in the user's hand, operation thereof is typically effected in one of two ways: (1) by having the user move his thumb from the side of the housing to the front of the housing and then depressing one of the keys on the front using the bottom surface or the inner side surface of the user's thumb or (2) by having the user hold the unit in one hand in the manner described above while manipulating the keys on the front of the housing using a finger on his other hand.

As can readily be appreciated, the manipulation and operation of a transmitter in the ways described above can become rather cumbersome and difficult after prolonged periods of time, particularly for those people who use the remote control transmitter to frequently change the channel and/or to adjust the volume of a television set. Moreover, particularly for those people who use a remote control unit while in a reclining or similar position, these problems are further exacerbated by the fact that the top end of the housing must be pointed in the direction of the device being controlled during actuation of one of the control keys to ensure that the light emitted from the transmitter will be detected by a corresponding receiver in the device being controlled. Finally, in addition to the aforementioned problems, in those instances in which the transmitter is held in one hand and is controlled by actuating the keys on the front of the unit using one's thumb as described above, attempts to actuate a desired key with the thumb are often unsuccessful due to the lack of sensitivity and the limited range of motion inherently associated with the human thumb.

An alternative way that is sometimes employed to hold and operate the above-described remote control transmitter with one hand is to hold the housing with the back facing down using the thumb on one side and the outer three fingers on the opposite side. The keys on the front may then be actuated with the user's index finger. One difficulty with this technique is that the unit is not well supported in the user's hand; consequently, the unit may be dropped or may pivot downwardly when downward pressure is applied to actuate the keys. This technique also suffers from the same problems of fatigue and awkwardness associated with the other techniques described above.

SUMMARY OF THE INVENTION

It is an object of the present invention to provide a new and novel wireless remote control transmitter for controlling the operation of a consumer entertainment electronics appliance.

It is another object of the present invention to provide a wireless remote control transmitter which is easy and inexpensive to assemble and which can be mass produced.

It is still another object of the present invention to provide an wireless remote control transmitter which is easy to operate and which overcomes at least some of the disadvantages discussed above in connection with existing wireless remote control transmitters.

It is still yet another object of the present invention to provide a wireless remote control transmitter which is adapted for use with one or more consumer entertainment electronic appliances, such as television sets, video casette recorders, stereo systems and the like.

According to one feature of the invention, a wireless remote control transmitter for operation of a consumer entertainment electronics appliance is provided in which at least some of the encoded electromagnetic radiation signals exit the transmitter through the side of the housing or the back of the housing or the top of the housing or any combination thereof.

According to another feature of the invention, a wireless remote control transmitter for operation of a consumer entertainment electronics appliance is provided which includes a manually operable control on the side of the housing.

Additional objects, features and advantages of the present invention will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts:

3

Figure 5:
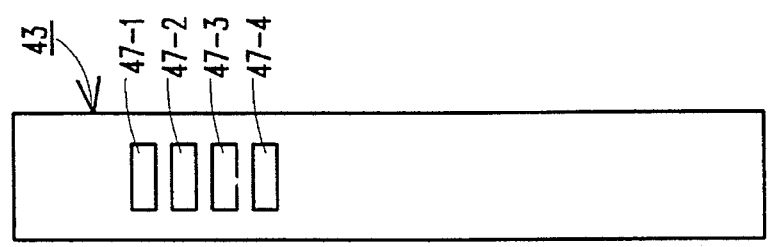
Figure 4:
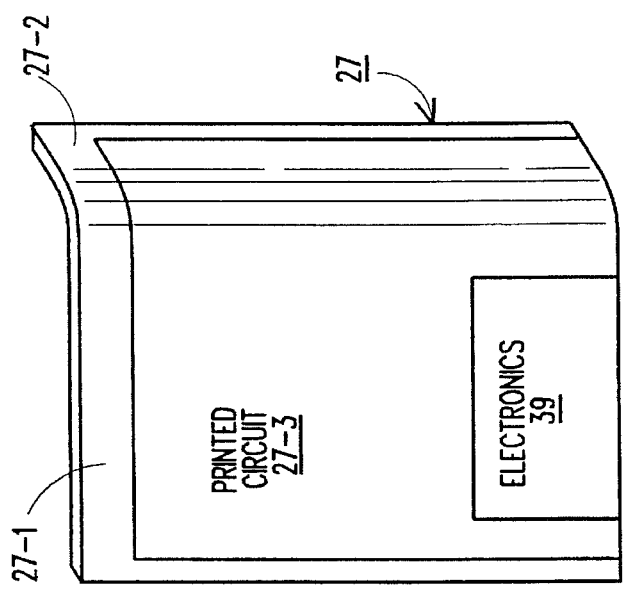
Figure 3:
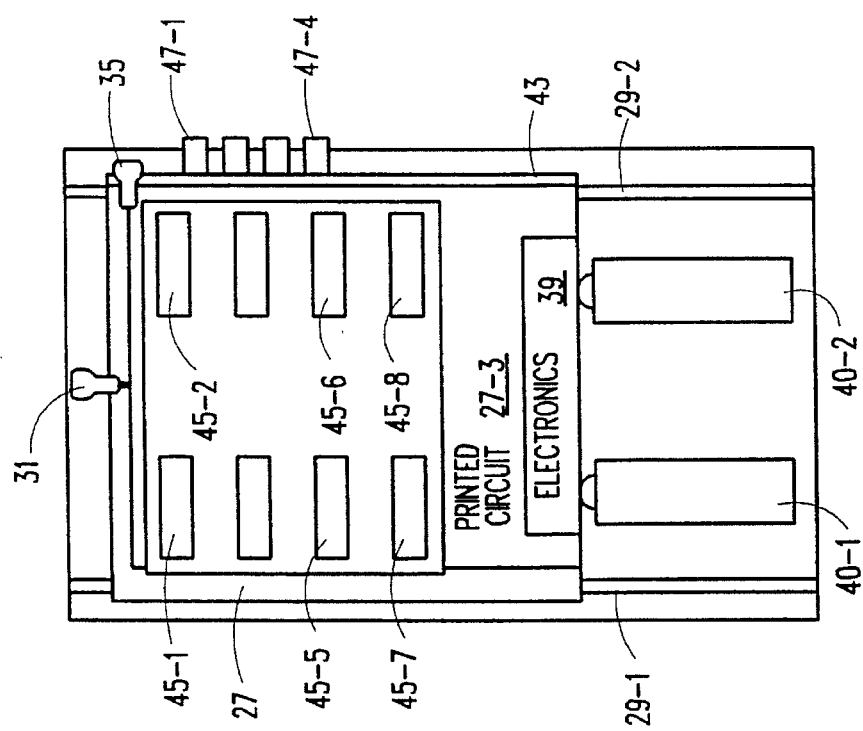
Figure 6:
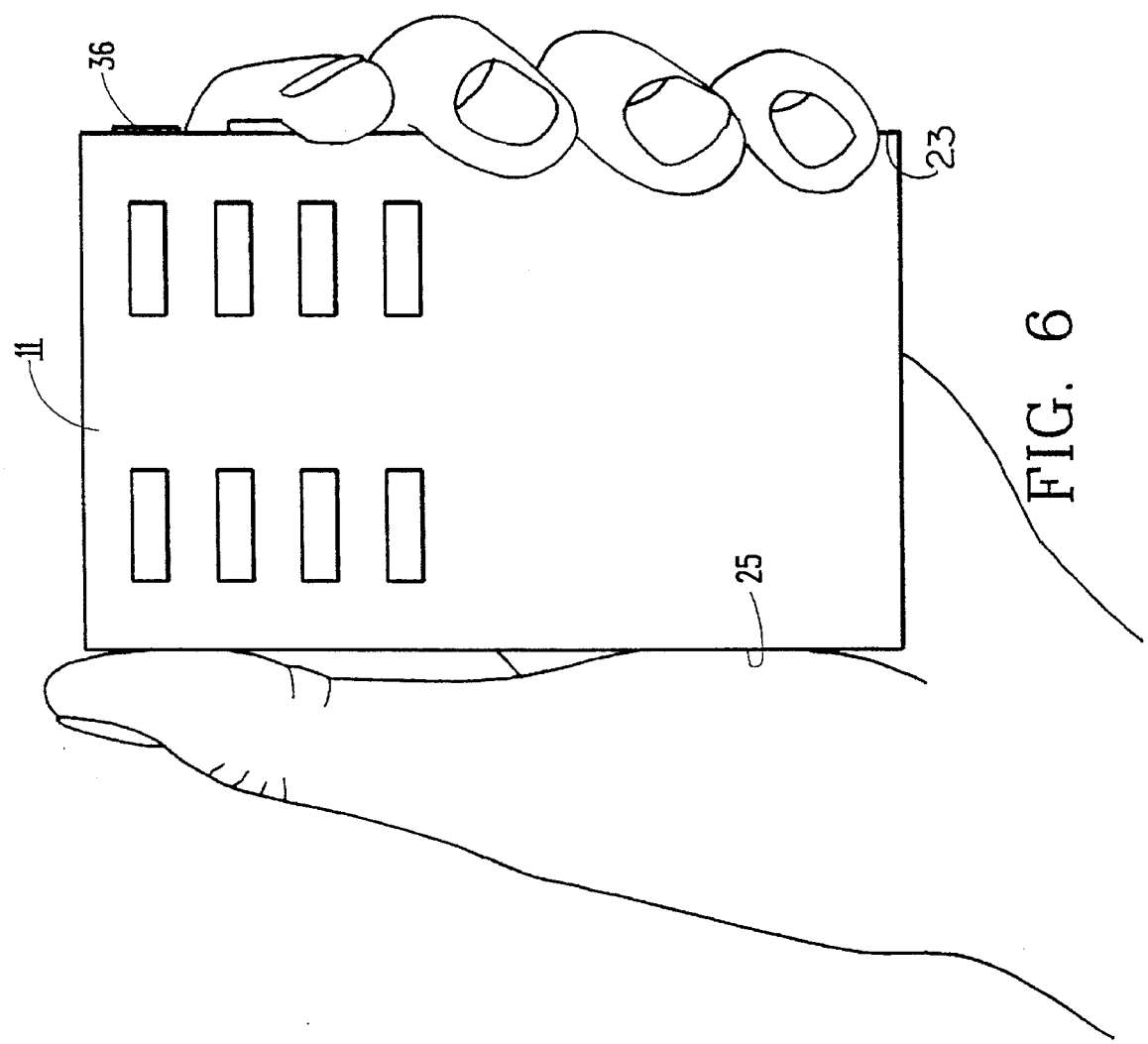
Figure 8:
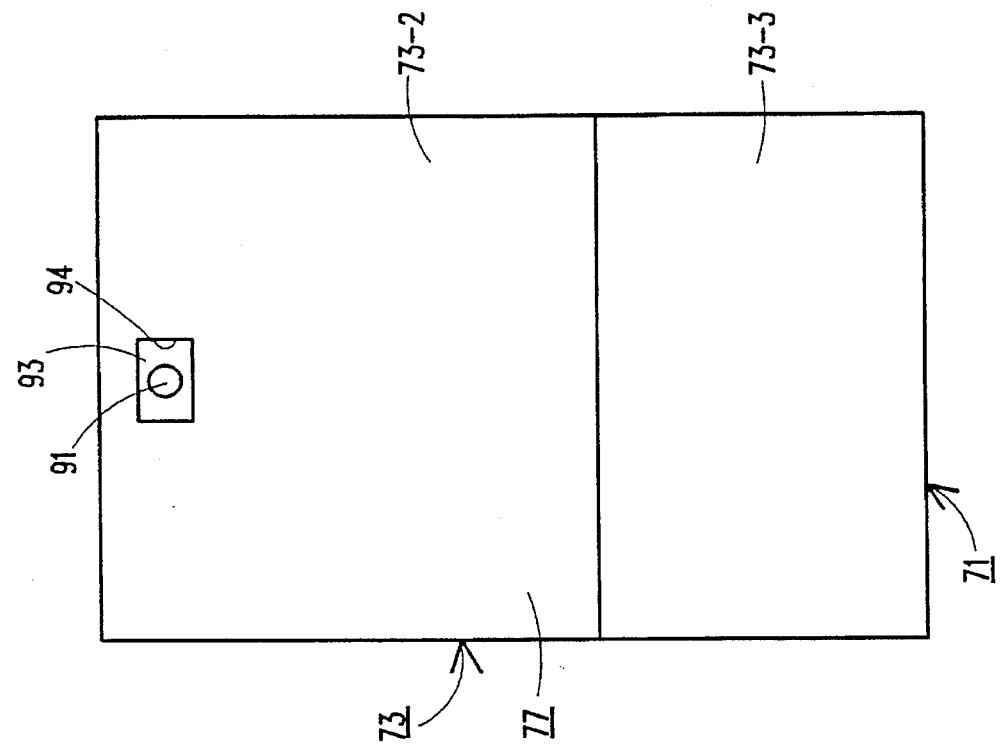
Figure 7:
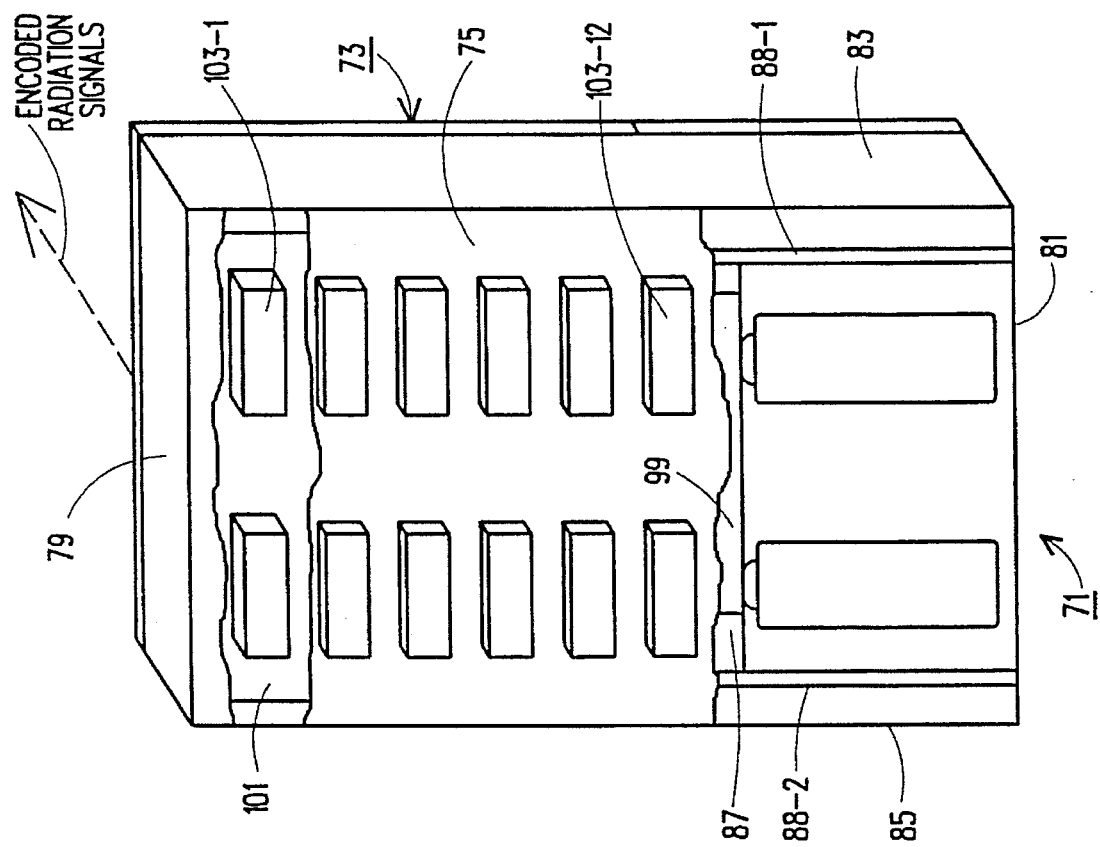
Figure 10:
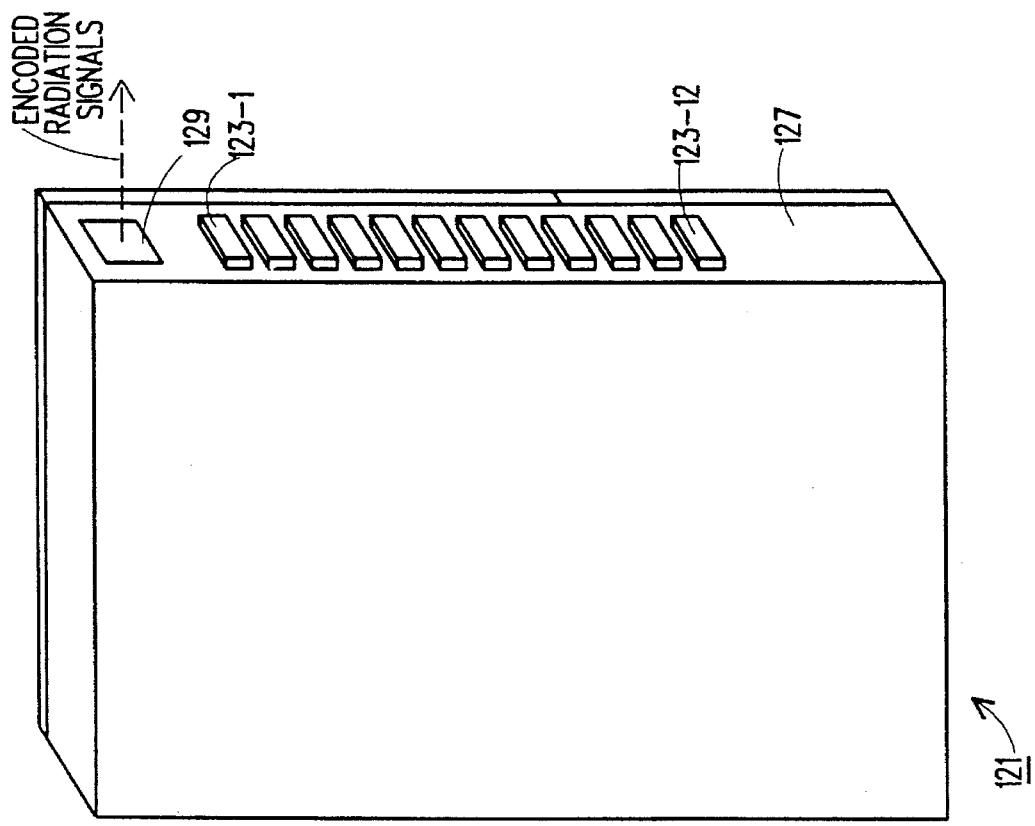
Figure 9:
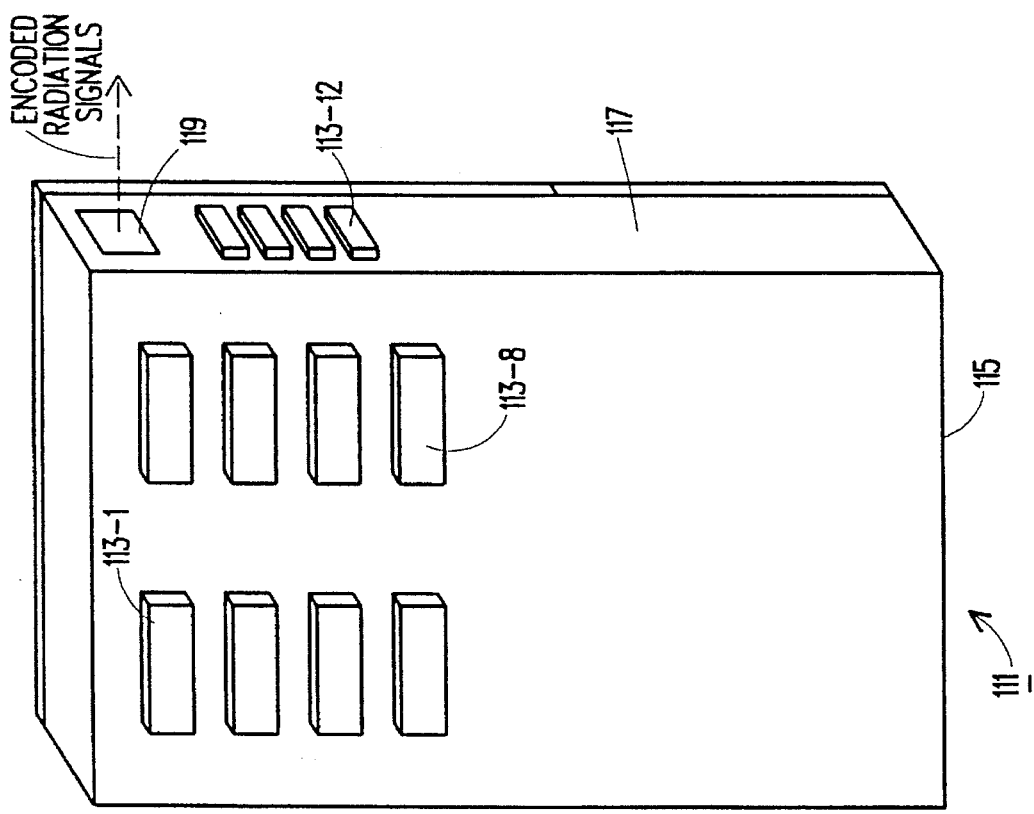
Figure 12:
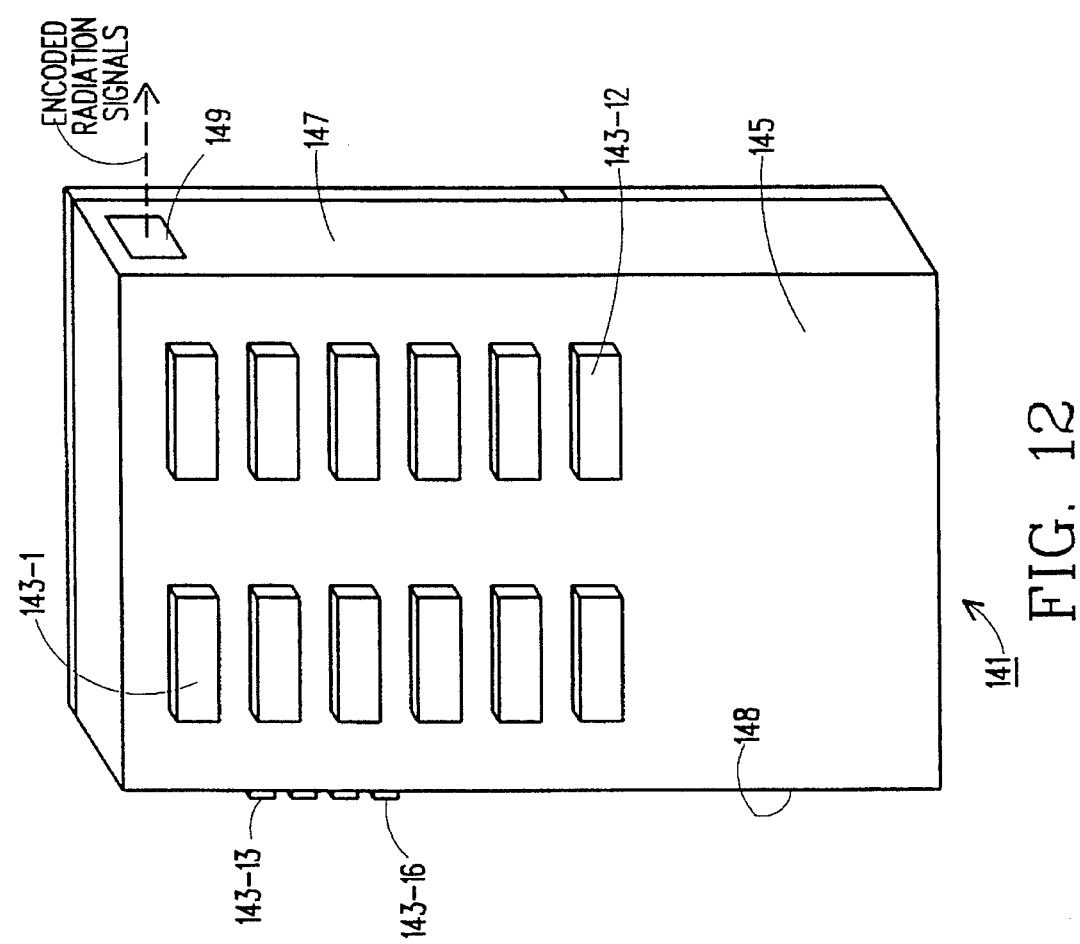
Figure 11:
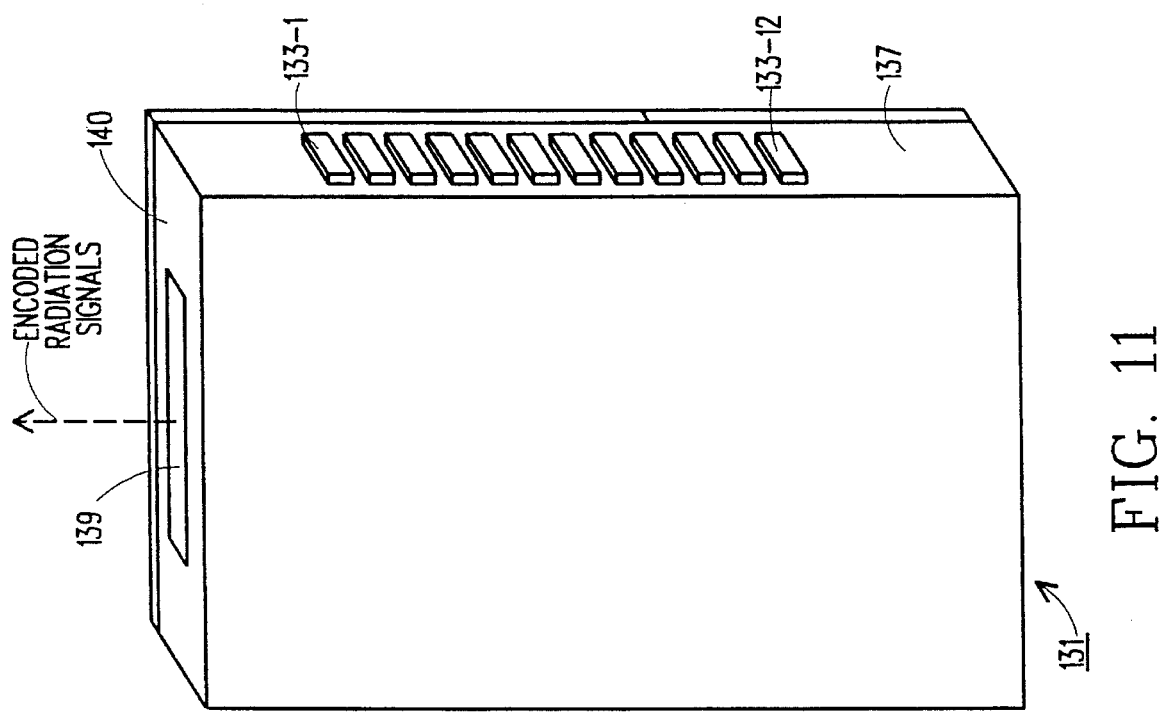
Figure 13:
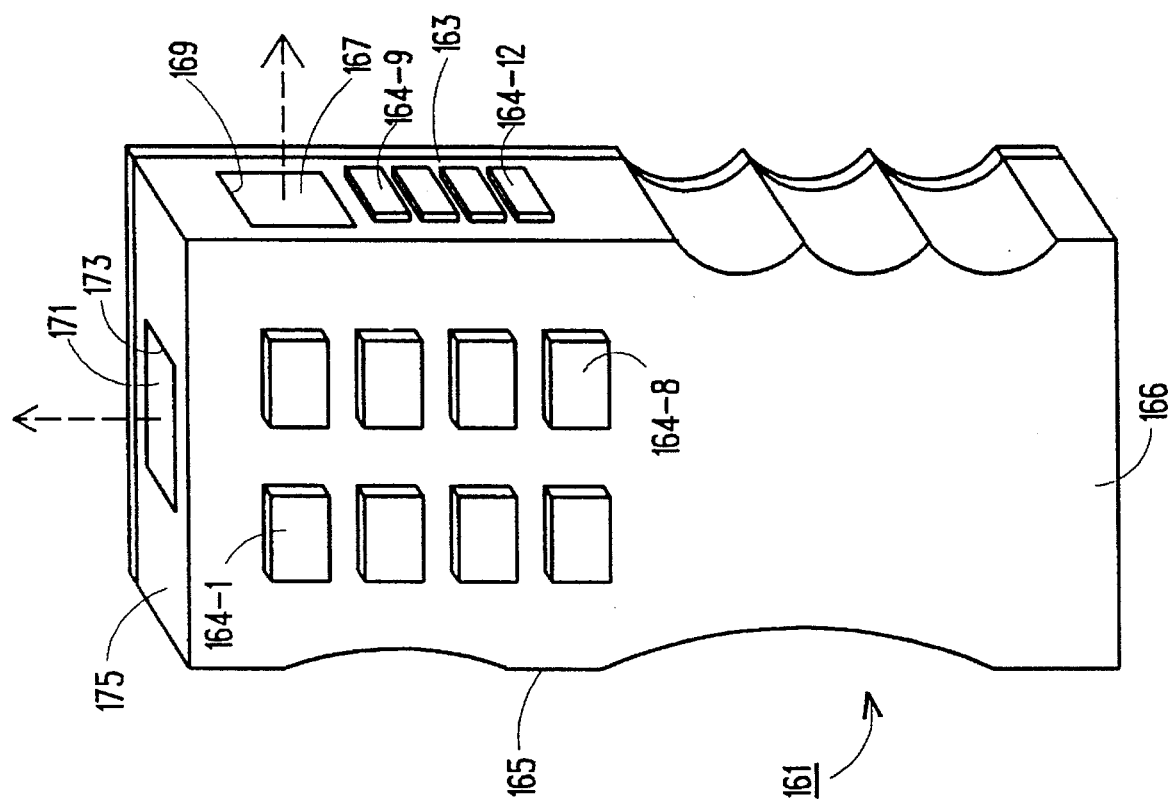

FIG. 1 is a perspective view taken from the front of a first embodiment of a wireless remote control transmitter constructed according to the teachings of the present invention;

FIG. 2 is a perspective view taken from the rear of the wireless remote control transmitter shown in FIG. 1;

FIG. 3 is a front view of the wireless remote control transmitter shown in FIG. 1 with the front piece of the housing removed;

FIG. 4 is a perspective view of the printed circuit board shown in FIG. 3;

FIG. 5 is a plan view of the side keyboard in the wireless remote control transmitter shown in FIG. 3;

FIG. 6 is a front view showing how the wireless remote control transmitter is held for use in the left hand of a user;

FIG. 7 is a perspective view taken from the front of another embodiment of a wireless remote control transmitter constructed according to the teachings of the present invention;

FIG. 8 is a plan view taken from the rear of the remote control transmitter shown in FIG. 7;

FIG. 9 is a perspective view taken from the front of another embodiment of the invention;

FIG. 10 is a perspective view taken from the front of another embodiment of the invention;

FIG. 11 is a perspective view taken from the front of another embodiment of the invention;

FIG. 12 is a perspective view taken from the front of another embodiment of the invention; and FIG. 13 is a perspective view taken from the front of another embodiment of the invention.

DETAILED DESCRIPTION OF PREFERRED EMBODIMENTS

Referring now to FIGS. 1 through 5, there is shown an embodiment of a wireless remote control transmitter constructed according to the teachings of the present invention for use in controlling the operation of a consumer entertainment electronics appliance, the wireless remote control transmitter being represented generally by reference numeral 11. Those portions of transmitter 11 which are well-known and do not form a part of the present invention are not described herein or shown.

Transmitter 11 comprises a generally rectangular housing 13. Housing 13 includes a front piece 13-1, an upper back piece 13-2 and a lower back place 13-3 which are fabricated from conventional materials such as plastic and which, when assembled, define a cavity bounded by a front 15, a back 17, a top end 19, a bottom end 21, a right side 23, and a left side 25. Front piece 13-1 and upper back piece 13-2 are press fit together. Lower back piece 13-3 is slidably mounted and snap locked onto upper back piece 13-2. Instead of being press fit, pieces 13-1 and 13-2 may be held together by screws or an adhesive.

Transmitter 11 also comprises a flexible printed circuit board 27 which is disposed within housing 13. Board 27, which is bent into an L-shaped structure having a front portion 27-1 and a right side portion 27-2, is supported within housing 13 by a pair of brackets 29-1 and 29-2 integrally formed on the inner surface of back 17. Board 27 includes a printed circuit 27-3 which extends over most of front portion 27-1 and right side portion 27-2.

A first infrared LED 31 is mounted on front portion 27-1 of board 27 and is positioned to transmit coded optical signals through a window 32 in an opening 33 formed in top end 19. A second infrared LED 35 is mounted on right portion 27-2 of board 27 and is positioned to transmit coded optical signals through a window 36 in an opening 37 formed in right side wall 23. Board 27 also includes electronics 39 (the particulars of which do not form a part of the present invention) which, when actuated by pressing one or more of the keys to be described below into contact with a corresponding portion of printed circuit 27-3, cause LED 31 or LED 35 to emit an encoded optical signal corresponding to a desired function of the remote device being controlled.

Transmitter 11 also includes a pair of batteries 40-1 and 40-2 which are removably mounted inside housing 13 and electrically connected to board 27. Batteries 40 are accessible by removing lower back piece 13-3.

Transmitter 11 further comprises a pair of conventional keyboards 41 and 43 for inputting commands to electronics 39. Keyboard 41 is positioned in front of top portion 27-1 of board 27 and has a plurality of manually depressable function keys 45-1 through 45-8 which extend outwardly through openings in front piece 13-1, the number of keys shown being for illustrative purposes only. Keyboard 43 is positioned in front of right portion 27-2 of board 27 and has a set of four manually depressable function keys 47-1 and 47-4 which extend outwardly through right side 23 of housing 13, the number of keys shown being for illustrative purposes only. When any one of keys 45-1 through 45-8 is depressed, electronics 39 causes LED 31 to transmit a corresponding coded signal through window 32 in top 19. When any one of keys 47-1 and 47-4 is depressed, electronics 39 causes LED 35 to transmit a corresponding coded signal through window 36 in right side 23.

For reasons to become apparent below, keys 47-1 and 47-4 are preferably reserved for controlling those functions of the consumer entertainment electronics appliance that are most frequently controlled by users. For example, if transmitter 11 is intended for use with a television set, keys 47-1 to 47-4 could correspond to the "channel up", "channel down", "volume up" and "volume down" keys Similarly, if transmitter 11 is intended for use with a stereo system, keys 47-1 to 47-4 could correspond to the "volume up", "volume down","power on" and "power off" keys. Other possible uses to which function keys 47-1 through 47-4 could be put will be readily apparent to those of ordinary skill In the art.

Transmitter 11 may be held in either the left hand or the right hand of a user.

In use, keys 45-1 through 45-8 may be operated using any of the techniques described above in the Background section. To operate keys 47-1 to 47-4 (e.g., to scan through a plurality of successive television channels or to adjust volume) using the left hand, transmitter 11 is preferably held between the user's thumb and/or thenar eminence on left side wall 25 and the user's middle, ring, and pinky fingers on right side wall 23, with light transmissive window 36 pointed in the direction of the electronic entertainment appliance to be controlled and back 17 facing the user's palm as shown in FIG. 6. Thus positioned, the user's index finger is free to depress keys 47-1 through 47-4. It is believed that by holding transmitter 11 like a gun and using a trigger-like motion to depress keys 47-1 through 47-4 the previously discussed problems of fatigue and awkwardness will be substantially reduced.

It should be understood that transmitter 11 merely illustrates an example of the type and number of keys 47 which may be operated from right side wall 23 of housing 13 in accordance with the teachings of the present invention. It should also be understood that flexible printed circuit board 27 of transmitter 11 could be replaced with a pair of printed circuit boards or the like disposed at a right angle and electrically connected with conventional electrical connectors. It should further be understood that LED's 31 and 35 could be replaced with a single LED and means, comprising a movable mirror or the like, for directing the beam of light emitted from the LED through either window 36 or window 32, depending upon which of keys 45 or 47 is depressed, Also the electronics could be arranged (i.e. printed circuit 27-3 designed) so that both LED's are energized when any key on either board is depressed. Also, electromagnetic radiation emitting devices other than infrared diodes such as for example, a microwave device, could be employed.

It should further be understood that board 27 and keyboard 43 could be arranged within housing 13 so that keys 47-1 to 47-4 extend outwardly through left side 25, as opposed to right side wall 23, to permit their actuation with the user's thumb.

Referring now to FIGS. 7 and 8, there is shown another embodiment of a wireless remote control transmitter constructed according to the teachings of the present invention, the wireless remote control transmitter being represented generally by reference numeral 71. Those portions of transmitter 71 which are well-known and do not form a part of the present invention are not described herein or shown.

Transmitter 71 comprises a generally rectangular housing 73. Housing 73 includes front piece 73-1 and upper and lower back pieces 73-2 and 73-3 respectively which are fabricated from conventional materials such as a rigid plastic and which, when assembled, define a cavity bounded by a front 75, a back 77, a top end 79, a bottom end 81, a right side 83, and a left side 85.

Transmitter 71 also comprises a printed circuit board 87 disposed within housing 73. Board 87, is supported within housing 73 by a pair of brackets 88-1 and 88-2 integrally formed on the inner surface of back 77.

An infrared LED 91 is mounted on board 87 and is oriented to transmit, when actuated, coded optical signals through a transmissive window 93 mounted in an opening 94 in back 77. Board 87 also includes electronics 99 (the particulars of which do not form a part of the present invention) which, when actuated using one of several manually operable keys to be described below, may be used to cause LED 91 to emit an encoded optical signal corresponding to a desired function of the consumer entertainment electronics appliance being controlled.

Transmitter 71 also includes a pair of conventional batteries 100-1 and 100-2 which are disposed within housing 73 and which are physically and electrically connected to board 87 in a conventional fashion to provide electrical current thereto.

Transmitter 71 further includes a conventional keyboard 101 which is disposed within housing 73. Keyboard 101 is positioned on top of board 87 and has a plurality of manually depressable function keys 103-1 through 103-12 which extend outwardly through front 75 of housing 73. When anyone of keys 103-1 through 103-15 is depressed, electronics 99 causes LED 91 to transmit a corresponding coded signal through window 93 of back 77.

Transmitter 71 may be held and operated in substantially the same way as conventional wireless remote control transmitters, the principal difference between transmitter 71 and conventional transmitters being that, when the keys of transmitter 71 are being operated, back 77, opposed to top end 79, is pointed in the direction of the appliance being controlled. Because it is believed that most users tend to hold an idle transmitter so that the bottom wall of the housing is already pointed in the direction of the appliance, it is believed that operation of transmitter 71 will be more comfortable and less awkward and the keys more easily identifable than conventional transmitters.

In FIG. 9 there is shown a perspective view of another embodiment 111 of a transmitter constructed according to this invention. In transmitter 111, the controls 113-1 through 113-12 are on the front 115 and the side 117 and the encoded signals all exit through a window 119 in an opening in side 117.

In FIG. 10 there is shown a perspective view of another embodiment 121 of this invention. In transmitter 121, the controls 123-1 through 123-12 are all on the side 127 and the encoded signals all exit through a window 129 in an opening in the side 127.

In FIG. 11 there is shown a perspective view of another embodiment 131 of this invention. In transmitter 131, the controls 133-1 through 133-12 are all on the side 137 and the encoded signals all exit through a window 139 in the top 140.

In FIG. 12 there its shown a perspective view of another embodiment 141 of this invention. In transmitter 141 the controls 143-1 through 143-16 are on the front 145 and the side 148 and the encoded signals all exit through a window 149 in the side 147.

In FIG. 13, there is shown a perspective view of another embodiment 161 of this invention. In transmitter 161, right side 163 is specifically contoured to conform to the shape of the lower three fingers of a hand while left side 165 is shaped to conform go the thumb and thenar eminence of the hand. Controls 164-1 through 164-8 are on the front 166 and controls 164-9 through 164-12 are on side 163. Encoded signals exit through a window 167 in an opening 169 in right side 163 or through a window 171 in an opening 173 in top 175.

The embodiments of the present invention recited herein are intended to be merely exemplary and those skilled in the art will be able to make numerous variations and modifications to it without departing from the spirit of the present invention. For example, instead of one L shaped flexible printed circuit board, there could be a pair of flat circuit boards, either electrically unconnected to each other or electrically connected by a suitable connector. All such variations and modifications are intended to be within the scope of the present invention as defined by the claims appended hereto.

What is claimed is:

1. A wireless remote control transmitter for remotely controlling the operation of a consumer entertainment electronics appliance, said wireless remote control transmitter comprising:

a) a housing, said housing including a front, a first side, a back and a second side, said front being wider than said first side;

b) an actuable electromagnetic radiation emitter disposed within said housing for emitting a control signal recognizable by the consumer entertainment electronics appliance;

c) a first keyboard, said first keyboard having a plurality of manually depressible function keys located along said first side of said housing; and d) a first printed circuit board positioned inside said housing, said first printed circuit board being responsive to contact with at least one of said manually depressible function keys for appropriately actuating said actuable electromagnetic radiation emitter.

2. The wireless remote control transmitter as claimed in claim 1 wherein said actuable electromagnetic radiation emitter comprises an infrared LED.

3. The wireless remote control transmitter as claimed in claim 1 wherein said housing is a generally rectangular housing.

4. The wireless remote control transmitter as claimed in claim 1 wherein said first side of said housing has an opening and wherein said actuable electromagnetic radiation emitter is positioned in said housing in such a way as to emit said control signal through said opening.

5. The wireless remote control transmitter as claimed in claim 4 wherein said first side of said housing is contoured to conform to the shape of at least one finger of a hand of a user.

6. The wireless remote control transmitter as claimed in claim 3 wherein said first side of said housing is contoured to conform to the shape of the lower three fingers of a hand of a user and wherein said second side of said housing is contoured to conform to the shape of the thenar eminence and thumb of said hand.

7. The wireless remote control transmitter as claimed in claim 1 further comprising a second keyboard having a plurality of manually depressible function keys located along said front of said housing and a second printed circuit board positioned inside said housing and responsive to contact with at least one of said manually depressible function keys on said keyboard for appropriately actuating said actuable electromagnetic radiation emitter.

8. The wireless remote control transmitter as claimed in claim 7 wherein said first and second printed circuit boards are an integral structure having an L-shape.

9. A wireless remote control transmitter for remotely controlling the operation of a consumer entertainment electronics appliance, said wireless remote control transmitter comprising:

a) a housing, said housing including a top end, a bottom end, a front, a back, a first side and a second side, said top end having a first opening and said first side having a second opening;

b) a first actuable electromagnetic radiation emitter disposed within said housing for emitting a control signal through said first opening in said top end of said housing, said control signal corresponding to a function of the consumer entertainment electronics appliance;

c) a second actuable electromagnetic radiation emitter disposed within said housing for emitting a control signal through said second opening in said first side of said housing, said control signal corresponding to a function of the consumer entertainment electronics appliance;

d) a first keyboard mounted in said housing, said first keyboard including a first plurality of manually depressible function keys positioned along said front of said housing;

e) a second keyboard mounted in said housing, said second keyboard including a second plurality of manually depressible function keys positioned along said first side of said housing; and f) a printed circuit board disposed inside said housing, said printed circuit board having a first portion responsive to contact with one or more of said first plurality of manually depressible function keys for causing said first actuable electromagnetic radiation emitter to emit a corresponding control signal and a second portion responsive to contact with one or more of said second plurality of manually depressible function keys for causing said second actuable electromagnetic radiation emitter to emit a corresponding control signal.

10. A wireless remote control transmitter for remotely controlling the operation of a consumer entertainment electronics appliance, said wireless remote control transmitter comprising:

a) a housing, said housing being generally rectangular in shape and including a front, a back, a first side, a second side, a top end and a bottom end, said front being wider than said first side, said housing having an opening said opening being in one of said first side, second side, and said top end;

b) an actuable electromagnetic radiation emitter disposed within said housing for emitting a control signal recognizable by the consumer entertainment electronics appliance through said opening;

c) a keyboard mounted in said housing, said keyboard comprising a manually depressible function key operable from one of said first side and said second side of said housing; and d) a printed circuit board mounted in said housing, said printed circuit board being responsive to contact with said manually depressible function key for appropriately actuating said actuable electromagnetic radiation emitter.

11. The wireless remote control transmitter as claimed in claim 10 wherein said opening is located in said first side and wherein said manually depressible function key is operable from said first side.

12. The wireless remote control transmitter as claimed in claim 10 wherein said opening is located in said second side and wherein said manually depressible function key is operable from said first side.

13. The wireless remote control transmitter as claimed in claim 10 wherein said opening is located in said top end.

\* \* \* \* \*